Patented Jan. 6, 1948

2,433,883

UNITED STATES PATENT OFFICE 2,433,883

OPHTHALMIC GLASS

William H. Armistead, Corning, N. Y., assignor to Corning Glass Works, Corning, N. Y., a corporation of New York No Drawing. Application August 19, 1946, Serial No. 691,663

10 Claims. (Cl. 106—54)

This invention relates to transparent ophthalmic glasses, small buttons of which are to be sealed into lenses of crown glass for the production of multifocal spectacle lenses. Glasses which are to be used for this purpose must meet certain requirements. Above all, they must seal properly with standard white optical crown glass which has a thermal expansion coefficient of $93 \times 10^{-7}$ cm. per cm. per degree C. and a softening point of about 725° C. Softening point is that temperature at which a fibre of the glass of specified size will elongate under its own weight at a given rate when suspended through a small furnace of specified dimensions (Viscosity of glass between the strain point and melting temperature, by H. R. Lillie, Jour. Am. Cer. Soc., vol. 14, page 502, July 1931). They must have good devitrification resistance during sealing and adequate chemical durability or resistance to weathering. Their purpose requires an index of refraction for the D line ($nD$) between 1.57 and 1.70 and it is desirable that they have a dispersive index ($\nu$) which is as high as possible. Prior ophthalmic glasses of high refractive index have a maximum dispersive index of about 32 which is less than desired. The prior glasses of lower refractive index have a maximum dispersive index of about 50 but have insufficient chemical durability.

The primary object of this invention is to provide ophthalmic glasses which have higher dispersive indices than has hitherto been obtainable in glasses of this type without sacrifice of other desirable properties.

Another object is to provide ophthalmic glasses having optical properties ranging from $nD=1.70$, preferably $nD=1.65$, $\nu=46$, to $nD=1.57$, preferably $nD=1.59$, $\nu=53$, but having at the same time good chemical durability, softening points below 700° C. and thermal expansion coefficients between 83 and $95 \times 10^{-7}$ cm. per cm. per degree C.

In general I have found that the above objects may be attained with glasses comprising 33% to 60% $SiO_2$, 1% to 7% $B_2O_3$, 4% to 15% $ZrO_2$, 0% to 25% BaO, 3% to 15% ZnO, .5% to 5% $Li_2O$, and 1% to 15% $Na_2O$. In lieu of $Na_2O$, $K_2O$ may be substituted wholly or in part. Although BaO may be absent, the glass preferably should contain at least 5% thereof because BaO raises the refractive index without unduly lowering the dispersive index. More than 25% BaO may cause devitrification. Other oxides, if desired, may be added with benefit as follows:

CaO raises the refractive index, although on a percentage basis it is not as effective as BaO. It is particularly valuable for further increasing the refractive index without causing devitrification in glasses having large BaO contents, but it may also be added to the glass irrespective of the presence or absence of BaO. Up to 15% CaO may thus be employed.

Up to 8% $Al_2O_3$ may be added, preferably but not necessarily in lieu of $SiO_2$. Such addition increases the resistance of the glass to devitrification.

$TiO_2$ may be incorporated in the glass with advantage to the optical properties and chemical durability. Both $TiO_2$ and $ZrO_2$ tend to raise the refractive index of the glass more than the other constituents but, whereas $ZrO_2$ has only a slight effect on the dispersive index, $TiO_2$ has a strong depressing effect on it. Hence, I prefer to use as much $ZrO_2$, between 4% and 15%, as will dissolve in the glass and to add as much $TiO_2$ as possible without unduly lowering the dispersive index. Up to 10% $TiO_2$ may thus be added.

The expansion coefficient for suitable sealing to the standard optical crown glass will vary somewhat with softening point and with composition, and the new glasses will seal satisfactorily if their expansion coefficients are between $83 \times 10^{-7}$ and $95 \times 10^{-7}$ cm. per cm. per degree C.

The following compositions in weight percentage as calculated from their batches are given by way of example but not as limitations of the invention:

|  | 1 | 2 | 3 | 4 | 5 | 6 |
|---|---|---|---|---|---|---|
| $SiO_2$ | 50.9 | 50.9 | 50 | 47.5 | 44.5 | 37.5 |
| $B_2O_3$ | 6 | 4 | 2 | 4 | 4 | 4 |
| $ZrO_2$ | 10.2 | 10.2 | 10 | 8 | 7 | 5.5 |
| BaO | 10 | 12 |  | 18 | 20 | 20 |
| ZnO | 12 | 10 | 12 | 5 | 7.5 | 10 |
| $Li_2O$ | 2.8 | 3 | 2 | 2 | 2 | 2 |
| $Na_2O$ | 8.1 | 7.9 | 12 | 7.5 | 6.0 | 4.5 |
| $Al_2O_3$ |  | 2 | 2 | 2 | 2 | 2 |
| CaO |  |  | 10 | 5 | 5 | 10 |
| $TiO_2$ |  |  |  |  | 1 | 4.5 |
| Softening Point, ° C. | 650 | 664 | 675 | 666 | 667 | 662 |
| Exp. Coeff.×$10^7$ |  | 83.3 | .88.8 | 88.3 | 86.4 | 90 |
| $nD$ | 1.5880 | 1.5882 | 1.5900 | 1.6051 | 1.6163 | 1.6537 |
| $\nu$ | 53.3 | 53.2 | 52.1 | 52.2 | 50.6 | 46.1 |

Compositions 5 and 6 are particularly suitable for combination with standard optical crown glass to produce bifocal lenses.

It is characteristic of the new glasses that they contain a substantial amount of $ZrO_2$. Commercial $ZrO_2$ sometimes contains a small amount of uranium as an impurity which is sufficient to cause fluorescence in bright light. This sometimes creates the appearance of an objectionable fog or haziness before the eyes when spectacle lenses composed of such glasses are worn in strong light. I have found that the objectionable fluorescence can be prevented by melting the glass under reducing conditions or by the addition of a small amount of $SnO_2$. The latter decomposes sufficiently during melting to cause reduction of the uranium to a lower valence which does not fluoresce.

I claim:

1. An ophthalmic glass which comprises 33% to 60% $SiO_2$, 1% to 7% $B_2O_3$, 4% to 15% $ZrO_2$, 0% to 25% BaO, 3% to 15% ZnO, .5% to 5% $Li_2O$, 1% to 15% $Na_2O$, the softening point being below 700° C., the refractive index ($nD$) being between 1.57 and 1.70 and the thermal expansion coefficient being between $83 \times 10^{-7}$ and $95 \times 10^{-7}$ cm. per cm. per degree C. between 0° and 300° C.

2. An ophthalmic glass which comprises 33% to 60% $SiO_2$, 1% to 7% $B_2O_3$, 4% to 15% $ZrO_2$, 0% to 25% BaO, 3% to 15% ZnO, .5% to 5% $Li_2O$, 1% to 15% $Na_2O$, up to 8% $Al_2O_3$, the softening point being below 700° C., the refractive index ($nD$) being between 1.57 and 1.70 and the thermal expansion coefficient being between $83 \times 10^{-7}$ and $95 \times 10^{-7}$ cm. per cm. per degree C. between 0° and 300° C.

3. An ophthalmic glass which comprises 33% to 60% $SiO_2$, 1% to 7% $B_2O_3$, 4% to 15% $ZrO_2$, 0% to 25% BaO, 3% to 15% ZnO, .5% to 5% $Li_2O$, 1% to 15% $Na_2O$, up to 15% CaO, the softening point being below 700° C., the refractive index ($nD$) being between 1.57 and 1.70 and the thermal expansion coefficient being between $83 \times 10^{-7}$ and $95 \times 10^{-7}$ cm. per cm. per degree C. between 0° and 300° C.

4. An ophthalmic glass which comprises 33% to 60% $SiO_2$, 1% to 7% $B_2O_3$, 4% to 15% $ZrO_2$, 0% to 25% BaO, 3% to 15% ZnO, .5% to 5% $Li_2O$, 1% to 15% $Na_2O$, up to 10% $TiO_2$, the softening point being below 700° C., the refractive index ($nD$) being between 1.57 and 1.70 and the thermal expansion coefficient being between $83 \times 10^{-7}$ and $95 \times 10^{-7}$ cm. per cm. per degree C. between 0° and 300° C.

5. An ophthalmic glass which comprises 33% to 60% $SiO_2$, 1% to 7% $B_2O_3$, 4% to 15% $ZrO_2$, 0% to 25% BaO, 3% to 15% ZnO, .5% to 5% $Li_2O$, 1% to 15% $Na_2O$, up to 15% CaO and up to 10% $TiO_2$, the softening point being below 700° C., the refractive index ($nD$) being between 1.57 and 1.70 and the thermal expansion coefficient being between $83 \times 10^{-7}$ and $95 \times 10^{-7}$ cm. per cm. per degree C. between 0° and 300° C.

6. An ophthalmic glass which comprises 33% to 60% $SiO_2$, 1% to 7% $B_2O_3$, 4% to 15% $ZrO_2$, 0% to 25% BaO, 3% to 15% ZnO, .5% to 5% $Li_2O$, 1% to 15% $Na_2O$, up to 8% $Al_2O_3$ and up to 15% CaO, the softening point being below 700° C., the refractive index ($nD$) being between 1.57 and 1.70 and the thermal expansion coefficient being between $83 \times 10^{-7}$ and $95 \times 10^{-7}$ cm. per cm. per degree C. between 0° and 300° C.

7. An ophthalmic glass which comprises 33% to 60% $SiO_2$, 1% to 7% $B_2O_3$, 4% to 15% $ZrO_2$, 0% to 25% BaO, 3% to 15% ZnO, .5% to 5% $Li_2O$, 1% to 15% $Na_2O$, up to 8% $Al_2O_3$, and up to 10% $TiO_2$, the softening point being below 700° C., the refractive index ($nD$) being between 1.57 and 1.70 and the thermal expansion coefficient being between $83 \times 10^{-7}$ and $95 \times 10^{-7}$ cm. per cm. per degree C. between 0° and 300° C.

8. An ophthalmic glass which comprises 33% to 60% $SiO_2$, 1% to 7% $B_2O_3$, 4% to 15% $ZrO_2$, 0% to 25% BaO, 3% to 15% ZnO, .5% to 5% $Li_2O$, 1% to 15% $Na_2O$, up to 8% $Al_2O_3$, up to 15% CaO and up to 10% $TiO_2$, the softening point being below 700° C., the refractive index ($nD$) being between 1.57 and 1.70 and the thermal expansion coefficient being between $83 \times 10^{-7}$ and $95 \times 10^{-7}$ cm. per cm. per degree C. between 0° and 300° C.

9. An ophthalmic glass which consists approximately of 37.5% $SiO_2$, 4% $B_2O_3$, 5.5% $ZrO_2$, 20% BaO, 10% ZnO, 2% $Li_2O$, 4.5% $Na_2O$, 2% $Al_2O_3$, 10% CaO and 4.5% $TiO_2$.

10. An ophthalmic glass which consists approximately of 44.5% $SiO_2$, 4% $B_2O_3$, 7% $ZrO_2$, 20% BaO, 7.5% ZnO, 2% $Li_2O$, 6% $Na_2O$, 2% $Al_2O_3$, 5% CaO and 2% $TiO_2$.

WILLIAM H. ARMISTEAD.